Jan. 22, 1952     J. W. CARDER     2,583,253
DEVICE FOR INDICATING THE TRUE SHAPE OF WORKPIECES
Filed Aug. 15, 1949     3 Sheets-Sheet 1
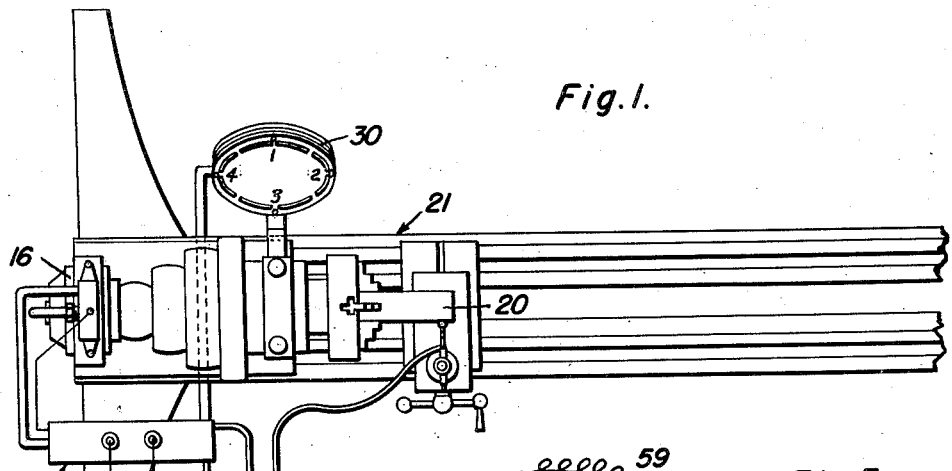
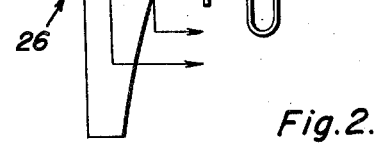
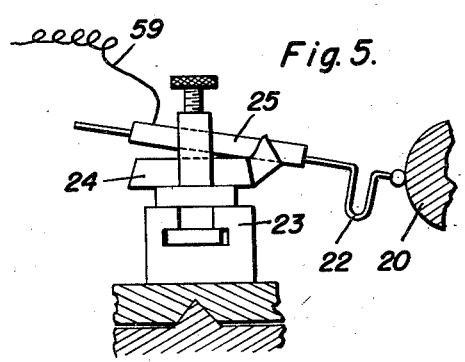
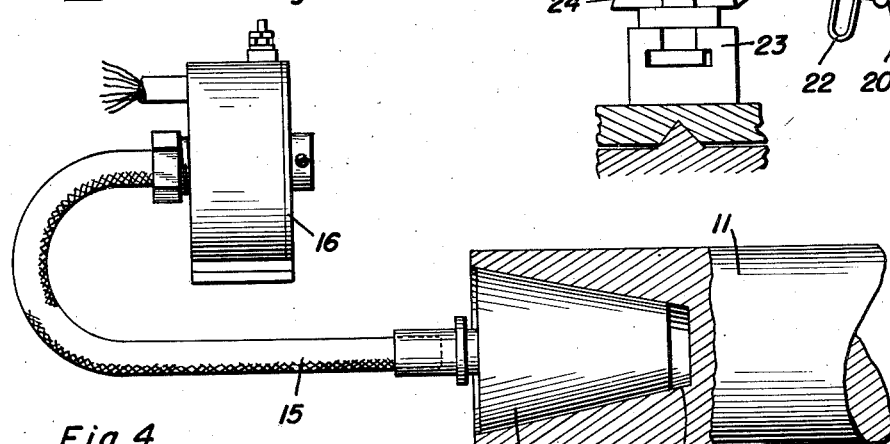
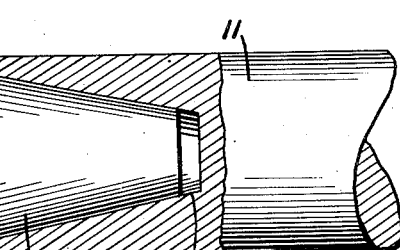
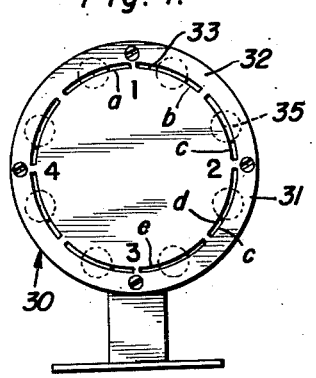
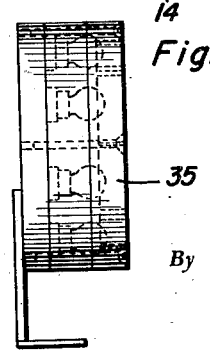
Inventor
James W. Carder
By *Clarence A. O'Brien and Harvey B. Jacobson*
Attorneys Jan. 22, 1952   J. W. CARDER   2,583,253
DEVICE FOR INDICATING THE TRUE SHAPE OF WORKPIECES
Filed Aug. 15, 1949   3 Sheets-Sheet 3
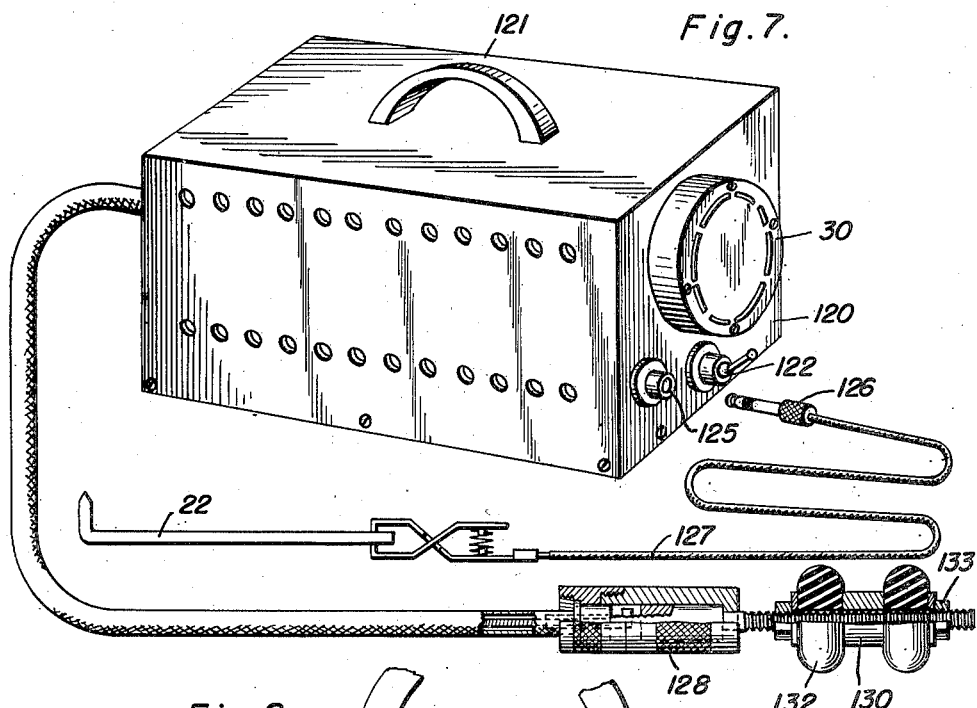
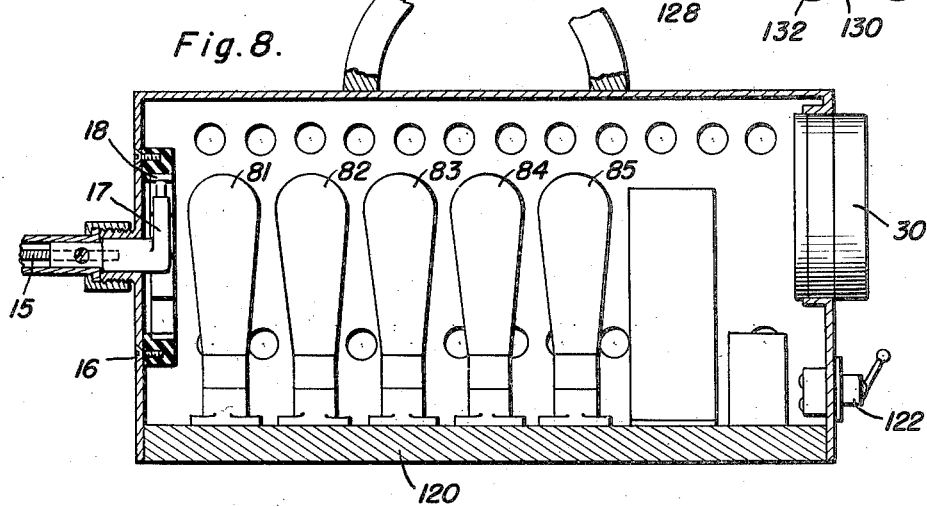
James W. Carder
INVENTOR.

Patented Jan. 22, 1952

2,583,253

UNITED STATES PATENT OFFICE 2,583,253

DEVICE FOR INDICATING THE TRUE SHAPE OF WORKPIECES

James W. Carder, Salem, W. Va.

Application August 15, 1949, Serial No. 110,401

7 Claims. (Cl. 33—169)

This invention relates to testing and indicating devices of the type indicating the deviation of the surface of a work piece from true shape as described in my earlier co-pending application Serial No. 776,345, and it has for its object to provide a device indicating deviations from the true shape of work pieces which are in the process of being machined and also indicating the location of the deviation and the extent to which the deviation is reduced during work.

Testing, gauging and centering devices using electric light indicators are known in the art but most indicators merely serve the purpose to indicate the fact that the surface of the work piece or its center deviates from the true shape or from the true center, but leaves it to the operator to determine the location of the irregularity and the extent of such irregularity.

In the above referred to earlier application Serial No. 776,345 an indicator was described operating by means of an adjustable feeler through which a current is flowing.

The object of the invention is an improvement of said testing and indicating devices as hitherto used, resulting in the removal of all guesswork when setting up the work piece in the machine tool, in the removal of all eye strain and fatigue, and in the truing of a work piece with an accuracy which has not been possible in known arrangements.

A further object of the invention consists in an improvement of the indicating device as described in the above mentioned earlier application Serial No. 776,345 resulting in the reduction of the weight and size of the indicator, in the elimination of a large number of moving parts, in connections which are more easily adaptable for A. C. operation, in a noiseless operation and in a reduction of the current consumption, the latter being of importance in connection with portable apparatus.

The main advantage of the improvement described in the following specification resides in the fact that the accuracy of the indicator according to the invention is not only much greater than that of mechanical or electromagnetical indicators, but that it also exceeds by far that of the mechanical precision tools customarily used in such work for determining the correct shape, so that the apparatus according to the invention cannot only be considered as a means for the rapid indication of deviations or aberrations from the true shape which could also be indicated by means of precision instruments, but the indicator forms itself a measuring device within a certain range of precision which is not covered by any other instrument which may be used by a skilled operator even when spending much time for a measurement.

A further main advantage of the invention consists in the fact that the currents passing through the feeler or probe arm are practically negligible so that neither relays nor a reduced voltage need be employed for reasons of safety.

According to the present invention the indicator comprises a probe arm or feeler forming part of an electric circuit completed by the work piece, a locator switch consisting of a number of contact segments arranged in a circle and a rotating contact arm, which contacts a segment corresponding to a zone on the work piece in contact with the probe arm or feeler, a series of electronic tubes each of which is associated with one of the contact segments and a number of indicating glow lamps on an indicator panel each controlled by one of the electronic tubes and so positioned that said lamps will illuminate a segment of the indicator corresponding to a zone on the work piece which deviates from the true shape.

The electronic arrangement according to the invention includes means for bringing the probe arm or feeler to a definite potential when the said probe arm is in contact with the work piece and it further includes electronic tubes which operate as soon as such a potential is established in the probe arm. A number of electronic tubes, equal to the number of segments of the locator switch are set for operation whenever such a definite potential exists in the probe arm, while only the individual segment on which the rotating contact of the locator switch rests for the time being is capable of making its tube conductive, thereby sending a current through the indicator lamp which illuminates the segment corresponding to the stretch on the work piece on which the probe arm rests. Only those indicating lamps are therefore operative which are located in sectors of the indicating device corresponding to the location of the probe arm or feeler on the work piece. Also, according to the invention, once the electronic tube has operated, it remains conductive as long as the current through the probe arm flows or as long as the latter is kept at definite potential. Therefore a segment or segments of the indicator which are illuminated by the indicator lamps indicates a point or zone on the work piece along which the probe arm or feeler touches the same.

The invention is illustrated in the accompanying drawing showing two embodiments of the same by way of example. It is however to be understood that the examples which are shown are merely illustrative and serve the purpose of explaining the principle of the invention and the best modes of applying said principle. These examples however are not to be considered as being limitative with respect to the modes of application of the principle of the invention and modifications of the examples shown in the drawing are therefore not necessarily departures from the essence of the invention.

In the accompanying drawing:

Figure 1 is a diagrammatic plan view showing part of a machine tool and the indicating apparatus applied to and arranged in front of and near the operator's stand.

Figure 2 is an elevational partly sectional view of the transmission of motion from the spindle or shaft of the machine tool to a locator switch.

Figure 3 is an elevational side view of the indicator used near the operator's stand.

Figure 4 is an elevational front view of the indicator.

Figure 5 is an elevational partly sectional view of the probe arm or feeler applied against the work piece.

Figure 7 is an isometric view of a portable apparatus of this type, part of the flexible shaft and the means for connecting the same with a machine tool being shown in section.

Figure 8 is an elevational sectional view of the portable apparatus as illustrated in Figure 7, the section being taken along a vertical plane of symmetry.

Figure 6:
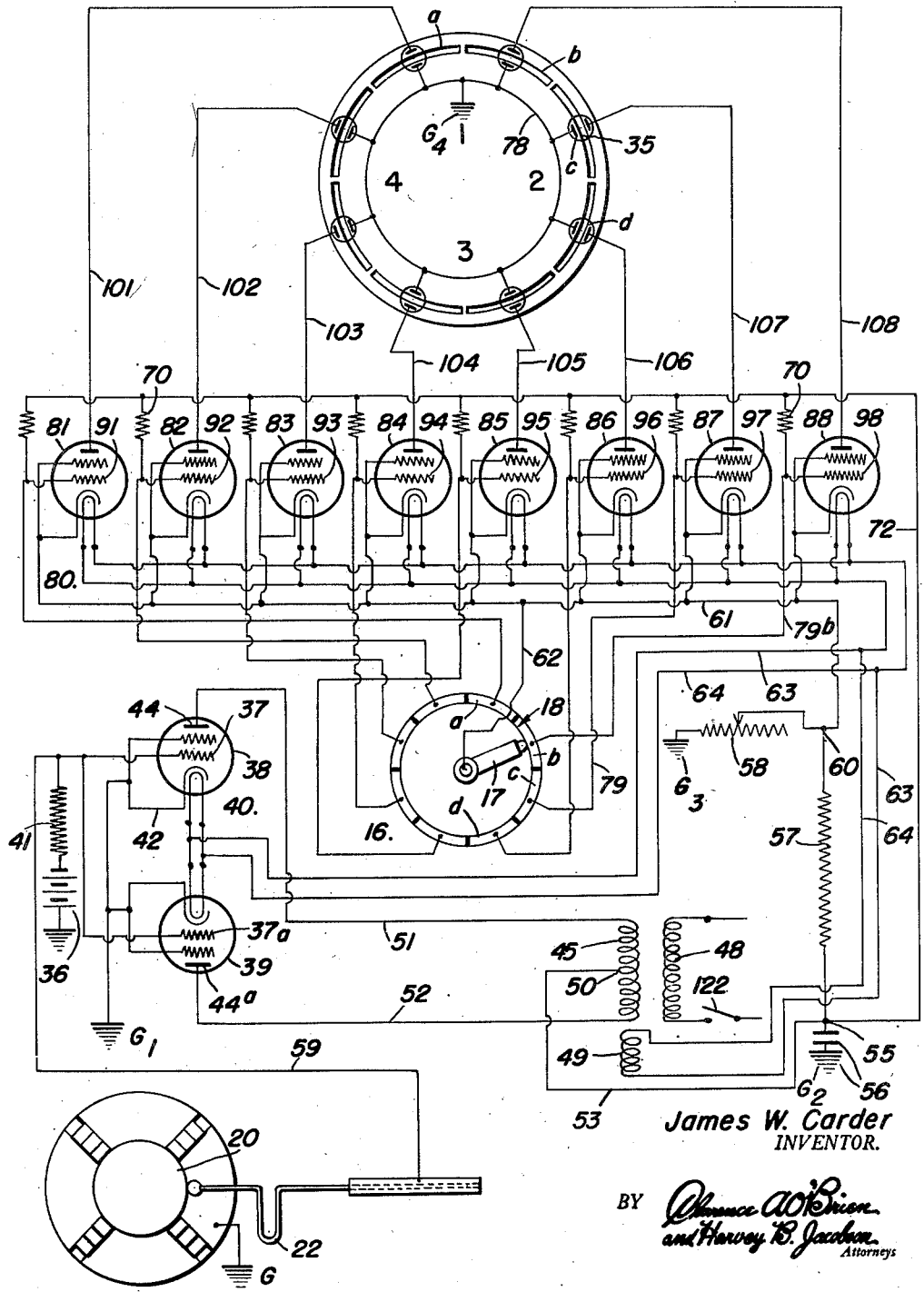
Figure 6 is a diagram of the connections and of the electronic arrangement used for the indicating device as illustrated in Figures 1, 2 and 5.

The device according to the invention has for its object to check the accuracy of a work piece which is in the process of being machined or shaped by a machine tool which is driven by a spindle or shaft 11. This shaft is provided on its end with a cavity 12 which may either be cylindrical or conical. The conical shape is shown in Figure 3 and the cavity cooperates with a conical friction plug 14 which may be inserted into it. The friction coupling member 14 therefore rotates with the shaft or spindle 11 and it drives the flexible shaft 15 which leads to the locator switch 16 consisting of a rotating contact arm 17 (see Figures 6 and 8) sliding on a number of contact segments 18. It will be clear that the speed of rotation of the contact arm 17 is equal to the speed with which the spindle 11 carrying the work piece 20 rotates, or in the event that a transmission should be inserted, is proportional to the speed of the spindle 11.

The work piece 20 is shown in the drawing as being mounted on the spindle stock of a lathe 21 which is shown partly in Figure 1. It is however to be understood that the invention is not specifically connected with lathes or with similar machine tools and that the lathe is merely representative of some kind of machine tool in which a work piece is machined while rotating.

The accuracy of the shape of the work piece which is moved with respect to a cutting tool is currently checked by the probe arm or feeler 22 which protrudes from a sleeve 25 which may be insulated and which is held in or mounted on a support 23 which, in its turn, is mounted on the rest of the lathe. The sleeve 25 is gripped in a suitable holder 24 permitting to hold the probe arm or feeler 22 and to apply it against the work piece in any desired position.

The work piece 20 is supposed to be grounded through the lathe and through the devices holding it and special precautions in order to secure grounding of the lathe may be taken.

On the side of the lathe 21 where the operator has his stand a box 26 containing the electronic tubes, switches and other electric devices is mounted, while on the opposite side of the lathe and facing the stand of the operator the indicator 30 is shown, which consists of a flat cylindrical box 31, covered by a front plate 32 provided with arcuate slots 33. The arcuate slots are preferably arranged in a circle and each slot covers an arc which corresponds to an arcuate portion of equal or proportional extension on the work piece. Eight slots are shown in the drawing but the number is adapted to the type of work to the work piece, to the speed and to the degree of accuracy which is to be maintained. The number of slots is always equal to the number of segments 18 on the locator switch 16.

Behind the front plate the box is divided into compartments, each compartment containing a lamp bulb 35 which in the example shown is a glow lamp filled with neon but which may of course also be of any other type. Each glow lamp bulb is so arranged with respect to the slots that when illuminated it illuminates a single slot.

The entire indicating apparatus 30 is arranged in front of the operator and approximately at the height of his eyes so that it can be supervised by the operator without difficulty. The illuminated slots indicate to the operator the "high spots" or zones on the work piece along which the feeler 22 touches the work piece as will be explained more fully below.

The arrangement thus far described corresponds more or less to the arrangement described by earlier application Serial No. 776,345 to which reference may be had with respect to further details of the arrangement.

The present invention has mainly for its object the means for operating the indicating lamps which differ from those which have been described in the aforesaid earlier application.

The means used in the arrangement shown in the drawing consist essentially of electronic tubes which provide a degree of accuracy which is unobtainable with other means.

The electronic tubes may all be preferably of the same type and, by way of example, thyratron tubes are used which block or intercept the flow of current through the tube upon application of a negative grid bias which is below a certain value. The tube however "fires" or permits current flow when the grid bias is raised above said value. It is also a characteristic of the tube that once the tube has fired the current flow through the tube will persist even if the grid bias after firing is lowered a little below the grid bias voltage at which firing originally occurs. Tubes 2D21 for example correspond to this description, but it is obvious that the type of tubes used is secondary, provided a cutoff voltage is used, below which the tube is blocked and above which the flow of current through the tube is started.

In the arrangement shown in the drawing two groups of thyratron tubes may be distinguished. A probe arm tube or tubes 40 are directly associated with the probe arm or feeler 22 and operate as soon as the contact between the probe arm 22 and the work piece 20 has been established. Adjustment may be made for operation before actual contact at the moment at which the ground potential G of the work piece can be made active.

A single probe tube may be used, but in order to be able to use A. C. feed lines of a building, such as customarily available, without any special rectifying means, it is preferable to use two thyratron tubes 38, 39 in a kind of push-pull connection. The two control grids 37, 37a of the thyratron tubes are both connected with the grounded grid bias battery 36 over the grid resistance 41; the battery is so connected with the grids 37, 37a that a high negative grid bias is obtained which however is just sufficiently high to block or intercept the flow of current through the tubes.

The cathodes 42 and the screen grids of the tubes 38, 39 are preferably grounded (G₁).

The plates 44, 44a of the tubes 38, 39 are connected with the two ends of a coil 45 which is center tapped at 46, and which is part of the transformer 48 which is connected with a source of current (not shown) which may be the usual 110 v. A. C. feed lines.

The transformer 48 providing current for the plate circuits may also have a further winding 49 in which a low voltage is produced for the heaters of the cathodes of the thyratron tubes.

The center 50 of the coil 45 is connected by means of conductors 53 with a connection point 55 which is grounded at G₂ over the capacity 56 and which is also connected with a resistance system consisting of two resistances 57, 58 one of which or both of which may be adjustable. The two resistances 57 and 58 are joined at a junction point 60. The resistance 58 is grounded separately and directly at G₃.

The junction point is connected by conductors 61, 62 to the rotatable switch arm of the locator switch, for a purpose described below. The second group of thyratrons is formed by the control group 80 which consists of a number of thyratron tubes 81, 82, 83 . . . 88 which is equal to the number of segments 18 on the rotatable locator switch 16. The cathodes of all the tubes of the group are connected with conductor 61 which is joined with the rotating arm 17 of the locator switch 16. The grids 91, 92, 93 . . . 98 of the tubes 81, 82, 83 . . . 88 are connected on one side over individual resistances 70 allotted to each tube and over a common conductor 72 with connection point 55, and on the other side, the said grids are connected with the segments 18 of the locator switch, each grid being connected by means of one of the conductors 79 with one of said segments 18.

The plates of the thyratron tubes 81, 82 . . . 88 are connected with plate circuits 101, 102, 103 . . . 108 each of which includes one of the indicator glow lamps 35 located behind the arcuate slots 33 of the box 31. In this case neon glow lamps are used and one of the electrodes of each of said lamps is connected with the plate circuit of one of the tubes while the other electrodes are joined to a common ground conductor 78 (grounded at G₄).

The heater of the cathode of the tubes 81, 82, 83 . . . 88 are supplied by conductors 63, 64 in the manner above explained.

The operation of the arrangement is the following: Referring first to the operator's truing operation let it be assumed that the work piece has a high spot and thus deviates from the true shape. The probe arm or feeler 22 is then pushed towards the work piece until contact is made between the probe arm and the work piece at the high spot, while the spindle and the work piece rotate at their normal speed. The contact between feeler and work piece lights the lamp bulb behind one of the slots, the section corresponding to said slot on the work piece being easily identifiable, if necessary. However—and this is one of the main advantages—no identification of the spot on the work piece is necessary. The operator proceeds by equalizing and working down the high spot, whereupon a further lamp will be lighted as the equalizing extends the zone of contact with the feeler. As the truing work progresses more slots are illuminated and the work is finished when all the slots are illuminated. Even a slight outward movement of the probe arm or feeler 22 then causes all the bulbs to go out.

During this operation the electronic arrangement operates as follows:

A contact between feeler 22 and work piece 20 puts ground potential on the feeler 22 and on conductor 59 connected with it. This also connects a ground potential with grids 37, 37a which is less negative than the grid bias potential provided by the battery 36. Therefore the tubes 38, 39 "fire" whenever a positive half wave passes one of the tubes 38, 39. This passage of the positive half wave occurs at the proper intervals when the coil 45 is energized from the network by means of transformer 48. As the current flows through the thyratron tubes only in one direction and as the tubes 38, 39 thus act as rectifiers, point 50 on coil 45 receives a definite D. C. potential which is also applied to point 55. This point is connected with the grids 91, 92, 93 . . . 98 of the thyratron tubes 81, 82, 83 . . . 88 through the resistances 70. Across the resistance 57 and by means of adjustable resistance 58 a voltage is developed at point 60 which is less negative than the voltage applied to the grids and which is also applied to cathodes of the tubes 81, 82, 83 . . . 88.

At the moment at which the feeler 22 touches the work piece 20 and operates the thyratron tubes 38, 39, the rotating arm 17 of the locator switch 16 is on a definite segment say on segment 18b of the switch 16. It is then seen that by means of conductors 61 and 62, the switch arm 17 and the segment b of group 18 and by means of conductors 79b, the grid 98 of tube 88 is supplied with a less negative voltage than the one applied to the other thyratron tubes 81, 82 . . . 87. It has of course been assumed that the voltage which has been applied to point 55 will be sufficiently negative to prevent tubes from firing. When the less negative voltage of point 60 is now applied to the grid 98 of tube 88, the tube fires and lights lamp 35b of the lamp group 35 which is located behind slots 33b of the group of slots 33.

It will be understood that when the probe arm or feeler 22 touches the work piece 20 this will be immediately indicated on the indicator circuit. The energization of the glow lamp 35 is relatively permanent and it lasts as long as the feeler touches the work piece. When, for instance, the feeler 22 touches the work piece along an arc of 180° lamps a, b, c, d of the lamp group 35 light up and stay lighted together and the thyratrons remain conductive, once they have been fired.

When the probe arm or feeler 22 gets out of touch with the work piece 20 the glow lamps are again extinguished.

Numbers or other markings such as the numbers 1, 2, 3, 4 shown on the dial or front wall of the indicator assist in locating the spot or zone of deviation from true shape relatively to the position of the test prod.

It will also be understood that the device as described may be used to check the balanced condition of a body of rotation for example and to detect any eccentric position of the center of gravity with respect to the axis of rotation. Such an eccentric position of the center of gravity entails vibrations of the body of rotation while rotating, and the test prod by suitable adjustment may detect such vibrations, as in this case, when properly adjusted, it does not come into contact with the surfaces of the body of rotation when the latter is at rest or is rotated slowly while contacting the said body during a rotation which produces such vibrations. This condition may therefore be readily and directly detected on the dial of the indicator.

The arrangement according to the invention has the major advantage that it can be introduced into a portable apparatus of the size of a portable radio apparatus. This modification is shown in Figures 7 and 8.

The portable apparatus consists of a small portable box 120 provided with a handle 121 into the front wall of which the indicator 30, such as above described, is built in. The front wall may also be provided with a switch 122 for controlling the current supply and with a jack 125 into which the plug 126 connected by a cable 127 with probe arm or feeler 22 is inserted.

The rear wall carries the rotary locator switch 16 and the flexible shaft 15 which drives the switch arm and which is attached in the manner which has been described before, the flexible shaft coupling 128 permitting to connect different coupling members with the same.

The coupling member which is shown in Figure 7 consists of a threaded screw spindle on which the coupling member consisting of two rubber wheels 132 is mounted. The rubber wheels 132 may be inserted into any cylindrical cavity of a spindle or shaft in order to establish a coupling of the flexible shaft 15 with said spindle or shaft. The rubber wheels are compressible by means of nuts 133 on the threaded screw spindle and by means of a spacer sleeve 130 arranged between said wheels. Pressure may be exerted, changing their diameter, so as to fill cavities approximately of the size of the wheels, with the latter being coupled by the pressure exercised in a radial direction.

In the interior of the box 120 the tubes 38, 39, 81, 82, 83 . . . 88 and the transformer 48 together with the condensers, resistances and other units are arranged.

Deviations of the work piece from its true shape of an extent which is not measurable by the usual measuring tools may be detected by the indicating apparatus.

It will be understood that the apparatus has been described specificially but that a number of changes may take place without departing from the invention defined in the annexed claims.

Having described the invention, what is claimed as new is:

1. A device for testing the true shape of work pieces and for indicating deviations from said shape, comprising means for rotating said work piece, a probe arm contacting said work piece, a probe circuit closed by the contact between probe arm and work piece, an indicator, including a number of indicating lamps, each lamp corresponding to a section of the work piece, a locator switch with a rotating arm and segments, said arm being moved over said segments at a speed proportional to the speed of the work piece and being connected with the probe circuit and energized during rotation of said work piece when the same comes in contact with the probe arm and means for maintaining one or more indicator lamps operative during the entire period of contact between said probe arm and said work piece, each of said means being connected with one of the segments of the locator switch.

2. A device for testing the true shape of work pieces and for indicating deviations from said shape, comprising means for rotating said work piece, a probe arm contacting said work piece, a probe circuit closed by the contact between probe arm and work piece, an indicator, including a number of indicating lamps, each lamp corresponding to a section of the work piece, means for operating said indicator lamps in succession, said means including a group of electronic tubes the number of which is equal to the number of indicator lamps, control circuits for said electronic tubes, each indicator lamp being controlled by one electronic tube of the aforesaid group, a locator switch with a number of segments equal to the number of electronic tubes of the aforesaid group, each locator switch segment being connected with the control circuit of one of the electronic tubes, said switch being further provided with a rotating contact arm moved over said segments at a speed proportional to the rotational speed of the work piece and coupled with the means for rotating the work piece, said contact arm being connected with a further portion of the control circuit, the voltage of which is controlled by the flow of current in the probe circuit.

3. A device for testing the true shape of work pieces and for indicating deviations from said shape, comprising means for rotating said work piece, a probe arm contacting said work piece, a probe circuit closed by the contact between probe arm and work piece, an indicator, including a number of indicating lamps, each lamp corresponding to a section of the work piece, means for operating said indicator lamps in succession, said means including a group of electronic tubes with control grids, the number of tubes being equal to the number of indicator lamps and each lamp being controlled by one tube of the group, means for controlling the operation of all the tubes controlled by the probe arm and means for controlling each individual electronic tube upon first contact of the probe arm with the section corresponding to the lamp, said means including a locator switch, with a rotating contact arm, coupled with the means for rotating the work piece and with a number of segments, each connected with the control grid of one of the tubes, each of said segments corresponding to one zone of contact of the probe arm with the work piece.

4. A portable apparatus according to claim 3, comprising a casing containing the electronic tubes, said casing including a front wall carrying the indicator, a rear wall carrying the locator switch, and a flexible shaft for connecting said switch with the means for rotating the work piece.

5. A device for testing the true shape of work pieces and for indicating deviations from said shape, comprising means for rotating said work piece, a probe arm mounted near the work piece for contact with the same, means for imparting a definite potential to said probe arm when in contact with the work piece, a first group of electronic tubes connected with said probe arm and controlled by the potential imparted to the same, a rotatable locator switch, including a rotatable contact arm, coupled for rotation with the means for rotating the work piece, and further including a number of contact segments, a control group of electronic tubes, with a number of tubes equal to that of the contact segments, the operation of the tubes of said group being controlled by the first group of electronic tubes connected with the probe arm and the operation of an individual tube within the control group being controlled by the locator switch, and a group of indicating lamps indicating contact of the probe feeler with the work piece, each indicating lamp being controlled by one of the electronic tubes of the control group.

6. A device for testing the true shape of work pieces and for indicating deviations from said shape, comprising means for rotating said work piece, a probe arm mounted near the work piece for contact with the same, means for imparting a definite potential to said probe arm when in contact with the work piece, a first group of electronic tubes provided with a control grid connected with said probe arm, said tubes being rendered conductive by the application of the probe arm potential, a rotary locator switch consisting of a rotating contact arm and of a number of contact segments, the rotating contact arm being coupled for rotation with the means for rotating the work piece, a further indicator controlling group of electronic tubes with control grids, adapted to be rendered conductive upon application of a predetermined potential, each control grid of the last named indicator controlling group being connected with the first named group connected with the probe arm by means of a common conductor and with one of the segments of the locator switch, the former connection providing a potential at which the tube remains operative once it has started to operate and the latter connection providing a potential at which the tube starts to operate, a number of indicator lamps equal to the number of segments on the locator switch and means to control each of said indicator lamps by an electronic tube of the said further group of electronic tubes.

7. A device for testing the true shape of work pieces and for indicating deviations from said shape, comprising means for rotating said work piece, a probe arm mounted near the work piece for contact with the same, means for imparting a definite potential to said probe arm when in contact with the work piece, a first group of electronic tubes provided with a control grid connected with said probe arm, said tubes being rendered conductive by the application of the probe arm potential, means for supplying the said electronic tubes with current, a common output and supply circuit for said group of tubes, means to develop a constant potential within said output and supply circuit, a rotary locator switch including a rotating contact arm, coupled with the means for rotating the work piece, and further including a number of contact segments, a further indicator controlling group of electronic tubes with control grids, adapted to render the tube non-conductive upon application of a predetermined cut-off potential, and of rendering it conductive upon application of a higher potential, the number of the electronic tubes in said group being equal to the number of segments of the locator switch, means connected with the output and supply circuit of the probe arm group of electronic tubes for applying a potential, developed in the aforesaid circuit, to all the control grids of the electronic tubes of the indicator controlling group of tubes, means for keeping said potential at a cut-off value before the operation of the electronic tubes has started and at a value at which the tube will be conductive after starting, a connection between each segment of the locator switch and the control grid of one of said electronic tubes, said connection forming part of a circuit including the rotary arm of the locator switch and closed when the said arm touches a segment for applying a potential on the control grid of an electronic tube of the indicator controlling group rendering the group conductive, output circuits for each of the aforesaid electronic tubes and indicating lamps controlled by said output circuits, the lamps being lighted successively upon contact of the probe arm with the work piece along a section corresponding to the zone of contact and said lamps remaining operative as long as such contact between probe arm and work piece lasts.

JAMES W. CARDER.

REFERENCES CITED

The following references are of record in the file of this patent:

UNITED STATES PATENTS

| Number | Name | Date |
| --- | --- | --- |
| 1,040,715 | Mann | Oct. 8, 1912 |
| 2,090,803 | Moore | Aug. 24, 1937 |
| 2,123,443 | Taylor | July 12, 1938 |
| 2,316,524 | Martin | Apr. 13, 1943 |